US 6,734,790 B1
May 11, 2004

(54) SECURITY ALARM WRIST WATCH

(76) Inventor: Scotty Hodger, P.O. Box 852, Parkin, AR (US) 72373

(*) Notice: Subject to any disclaimer, the term of this patent is extended or adjusted under 35 U.S.C. 154(b) by 0 days.

(21) Appl. No.: 10/138,151

(22) Filed: May 1, 2002

(51) Int. Cl.[7] .............................................. B60R 25/10
(52) U.S. Cl. ........................... 340/426.12; 340/825.72; 307/10.2
(58) Field of Search ............................ 340/426.12, 429, 340/539.1, 566, 555, 557, 425.5, 825.72; 307/10.2, 10.3

(56) References Cited

U.S. PATENT DOCUMENTS

| | | | |
|---|---|---|---|
| 4,885,572 A | * 12/1989 | Iwata et al. | 340/425.5 |
| 5,276,728 A | 1/1994 | Pagliaroli et al. | |
| 5,382,948 A | 1/1995 | Richmond | |
| 5,432,495 A | 7/1995 | Tompkins | |
| 5,623,245 A | 4/1997 | Gilmore | |
| 5,652,564 A | 7/1997 | Winbush | |
| 5,677,664 A | * 10/1997 | Sawinski | 340/426 |
| 5,739,747 A | * 4/1998 | Flick | 340/426 |
| 5,903,653 A | 5/1999 | Ross et al. | |
| 6,009,320 A | 12/1999 | Dudley | |
| 6,028,506 A | 2/2000 | Xiao | |
| 6,097,106 A | 8/2000 | Roddy et al. | |

* cited by examiner

*Primary Examiner*—Anh V La
(74) *Attorney, Agent, or Firm*—John D. Gugliotta; Olen L. York, III

(57) ABSTRACT

A watch-type pager is provided that is electronically linked with an electronic car alarm. A standard electronic car alarm which operates in an otherwise conventional manner with various sensors monitoring the doors, the hood, the trunk, movement, shock and the like. The alarm is armed by either a passive arming system or an active system such as a key switch or an RF key fob. If the alarm is activated by a thief, the system would trigger a transmitter in the car which would have a range of approximately 2½ miles. This electronic alert would activate the watch which would, in turn, display a visual alert and trigger a powerful vibrating mechanism to warn the wearer of a possible motor vehicle break in. The vibrating mechanism would be strong enough to be felt even if the watch were in the user's pocket. A voice annunciation could also be enabled. In addition, standard watch functions such as date, time, and a back light would be included for convenience and efficiency.

13 Claims, 4 Drawing Sheets

SECURITY ALARM WRIST WATCH

RELATED APPLICATIONS

The present invention was first described in Disclosure Document Registration filed on 480,776 under 35 U.S.C. §122 and 37 C.F.R. §1.14, on Oct. 6, 2000. There are no previously filed, nor currently any co-pending applications, anywhere in the world.

BACKGROUND OF THE INVENTION

1. Field of the Invention

The present invention relates generally to emergency alarm communication systems and, more particularly, to an audible alarm system mounted within a wrist watch.

2. Description of the Related Art

Since the automobile was invented, mankind has been figuring out how to secure it from theft and unauthorized use. Many different methods of securing motor vehicles have been invented, but each has had its associated drawbacks. Door and ignition keys can be lost or picked. Anti-theft clubs or locking bars are clumsy, difficult to use and easily defeated by bending or cutting the steering wheel. Kill switches are difficult to install, can malfunction and can also be bypassed by knowledgeable thieves. Various electronic alarms provide good results, but as their use and popularity grows, they are, increasingly, ignored. Also, if the owner or driver is out of hearing distance of the alarm horn or siren, he or she will not know of the attempted break-in, and thus will not be able to take any pre-emptive action such as calling the police.

A search of the prior art did not disclose any patents that read directly on the claims of the instant invention; however, the following references were considered related.

The following patents disclose an integrated remote keyless entry and ignition disabling system for vehicles.

U.S. Pat. No. 6,097,106 issued in the name of Roddy et al.
U.S. Pat. No. 5,903,653 issued in the name of Ross et al.
U.S. Pat. No. 5,652,564 issued in the name of Winbush
U.S. Pat. No. 5,623,245 issued in the name of Gilmore
U.S. Pat. No. 5,432,495 issued in the name of Tompkins
U.S. Pat. No. 5,382,948 issued in the name of Richmond
U.S. Pat. No. 5,276,728 issued in the name of Pagliaroli et al.

The following patents describe a car alarm transmitting and paging system.

U.S. Pat. No. 6,028,506 issued in the name of Xiao
U.S. Pat. No. 6,009,320 issued in the name of Dudley Consequently, there is a need for a means by which motor vehicles can be secured from possible theft without any of the disadvantages as described above.

SUMMARY OF THE INVENTION

It is therefore an object of the present invention to provide an improved emergency alarm communication systems.

It is a feature of the present invention to provide an improved audible alarm system mounted within a wrist watch.

Briefly described according to one embodiment of the present invention, a watch-type pager that is electronically linked with an electronic car alarm is provided. The invention utilizes a standard electronic car alarm which operates in a conventional manner with various sensors monitoring the doors, the hood, the trunk, movement, shock and the like. The alarm is armed by either a passive arming system or an active system such as a key switch or an RF key fob. If the alarm is activated by a thief, the system would trigger a transmitter in the car which would have a range of approximately 2½ miles. This electronic alert would activate the watch which would, in turn, display a visual alert and trigger a powerful vibrating mechanism to warn the wearer of a possible motor vehicle break in. The vibrating mechanism would be strong enough to be felt even if the watch were in the user's pocket. A voice annunciation could also be enabled. In addition, standard watch functions such as date, time, and a back light would be included for convenience and efficiency.

The use of the present invention allows for increased vehicle security by affording the owner/driver the knowledge that an attempted theft may be occurring.

Advantages of the present invention are that is discourages vehicle theft, informs owner/driver that a theft may be occurring, and is easy and convenient to use.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

LIST OF REFERENCE NUMERALS UTILIZED IN THE DRAWINGS

Figure 1:
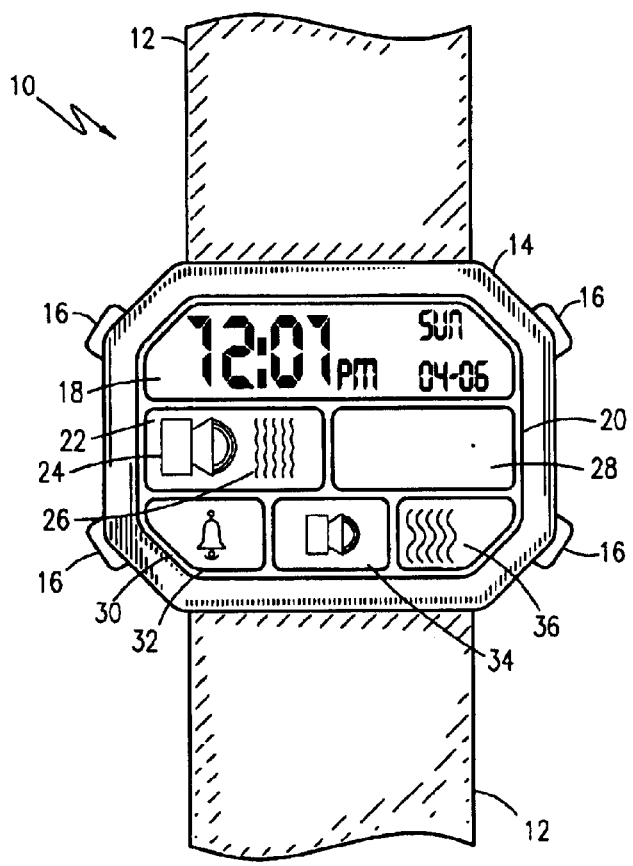
FIG. 1 illustrates a security alarm wrist watch viewed from the front.

| | |
|---|---|
| 10 Security Alarm Wrist Watch | 48 Vehicle Sensors |
| 12 Fastening Band | 50 Door Sensor |
| 14 Display Face | 52 Engine Hood Sensor |
| 16 Watch Control Means | 54 Rear Trunk Sensor |
| 18 Upper Display Cluster | 56 Window and Windshield Sensor |
| 20 Intermediate Display Cluster | 58 Vehicle Movement Sensor |
| 22 Visual Alarm Display | 60 External Shock Sensor |
| 24 Audible Alarm Indicator | 70 Wrist Watch Face |
| 26 Vibrational Alarm Indicator | 72 Hour/Minute Markings |
| 28 Speaker | 74 Hour Hand |
| 30 Lower Display Cluster (Alarm Activation Cluster) | 76 Minute Hand |
| | 78 Rotable Center Stem |
| 32 Visual Alarm | 80 Back Pane Support Means |
| 34 Audible Alarm | 82 Outer Luminescent Region |
| 36 Vibration Alarm | 84 Intermediate Luminescent Region |
| 38 Central Control Unit | |
| 40 Radio Frequency or Infrared Transmitter | 86 Inner Luminescent Region |
| | 88 Rotable Winding Stem |
| 42 Antenna | 90 Stem or Key |

-continued

LIST OF REFERENCE NUMERALS UTILIZED IN THE DRAWINGS

| | |
|---|---|
| 44 Radio Frequency or Infrared Vehicle Receiver | 92 Speaker |
| 46 Radio Frequency or Infrared Wrist Watch Receiver | 94 Transparent Protective Means |

DESCRIPTION OF THE PREFERRED EMBODIMENTS

1. Detailed Description of the Figures

Referring now to FIG. 1, a security alarm wrist watch 10 is shown, according to the present invention, comprising a fastening band 12 for securing the security alarm wrist watch 10 to a person's wrist, and further comprising a display face 14 which displays time, day, date and security alarm information.

The display face 14 houses an upper display cluster 18, an intermediate display cluster 20, a lower display cluster (alarm activation cluster) 30, and a plurality of watch control means 16 by which a user can adjust the time, day and date information of the security alarm wrist watch 10.

The upper display cluster 18 is similar to a standard digital watch in which the time, day and date are displayed in a variation of arrangements on the face. A standard digital watch display is well known in the art of wrist watches.

The intermediate display cluster 20 houses a visual alarm display 22 and a speaker 28 through which an audible alarm may be transmitted. The visual alarm display 22, upon activation, will display an appropriate indicator light indicating that the visual alarm is activated. Optionally, an audible alarm indicator 24 will appear when an audible alarm is activated. Optionally, a vibrational alarm indicator 26 will appear when a vibrational alarm is activated.

Figure 2:
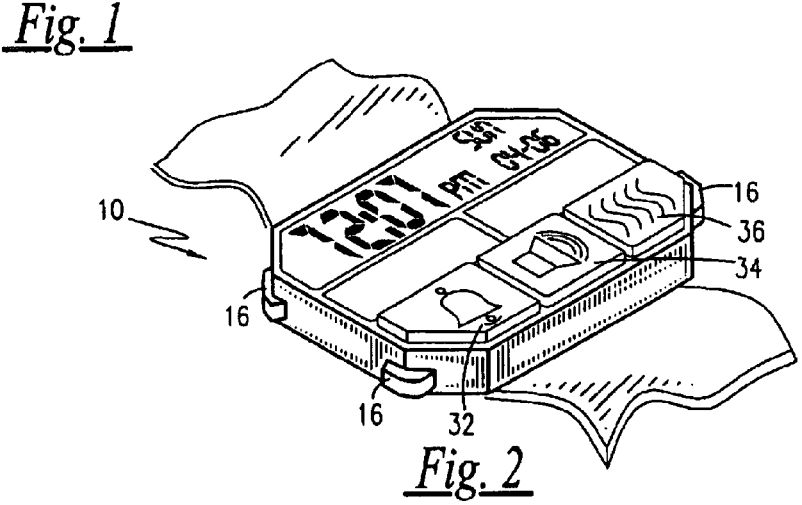
FIG. 2 is a perspective view illustrating an alternative raised key feature viewed from the left side of the security alarm wrist watch.

The lower display cluster (alarm activation cluster) 30 houses a plurality of alarm control means for activating and deactivating the various alarms, which may include an activation key for a visual alarm 32, an activation key for an audible alarm 34, and an activation key for a vibration alarm 36. In one embodiment, the plurality of alarm control means would rest flat against the surface of the display face 14, resulting in a smooth feel if a user would run a finger along the alarm activation cluster 30. This embodiment would provide better assurance that the alarm system would not accidentally become engaged or disengaged through bumping or similar means. In an alternative embodiment, illustrated in FIG. 2, the plurality of alarm control means would rest as raised keys, such as the buttons on a calculator or other similar device.

Figure 3:
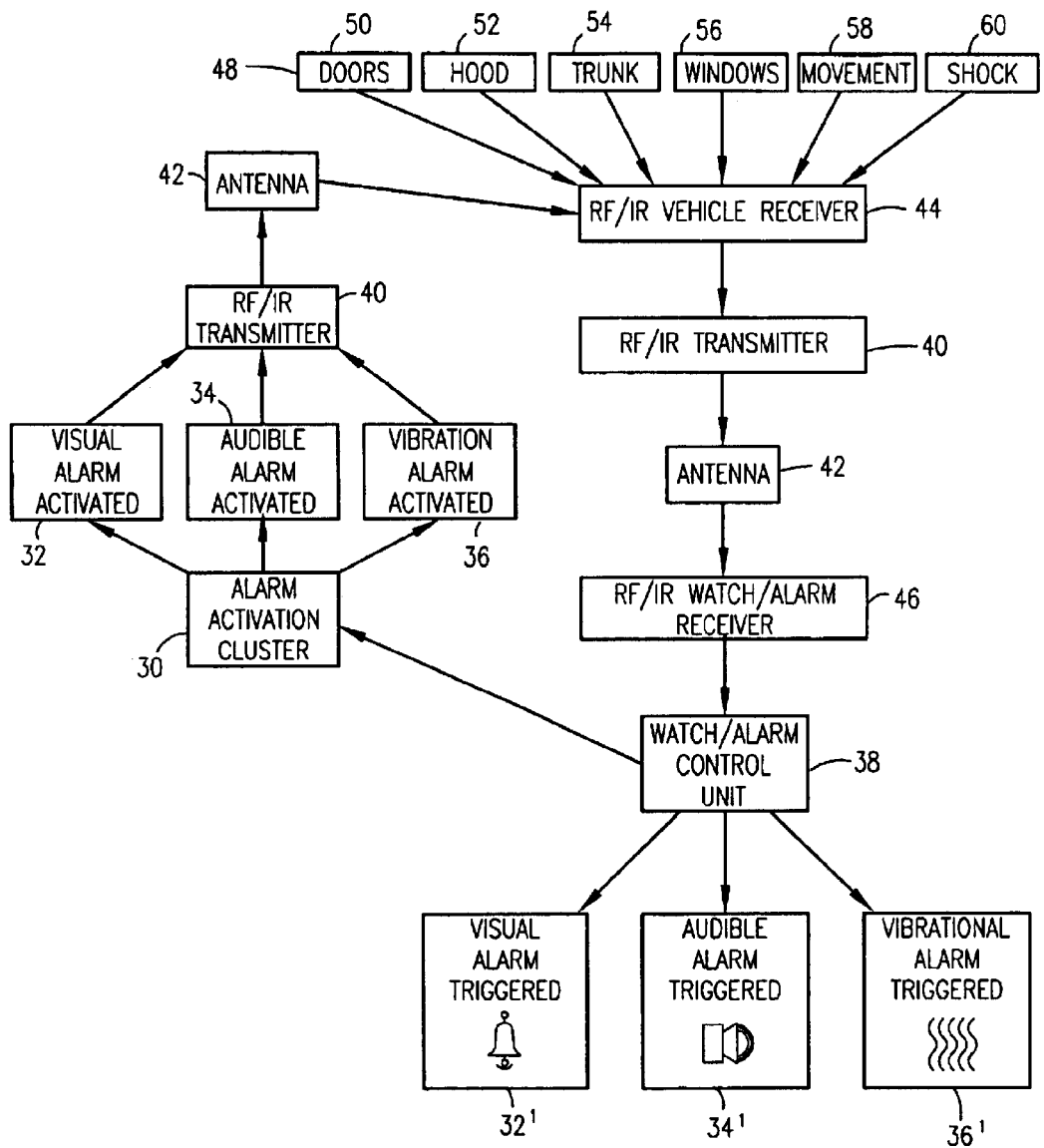
FIG. 3 is a schematized block diagram illustrating the operation of the security alarm wrist watch.

Referring now to FIG. 3, the electronic operation of the present invention can be described. A wrist watch central control unit 38 is housed within the circuitry of the display face 14 of FIG. 1. A user activates the desired alarm signal by choosing the appropriate key from the alarm activation cluster 30, which may include activation of a visual alarm 32, an audible alarm 34, and/or a vibrational alarm 36. The activation of a specific alarm signal is transmitted by radio frequency or infrared transmitter 40, which is received by an antenna 42 coupled to a radio frequency or infrared vehicle receiver 44.

The radio frequency or infrared vehicle receiver 44 is coupled to a plurality of vehicle sensors 48, which may include sensors monitoring the doors 50, engine hood 52, rear trunk 54, all windows and windshields 56, and may further include sensors to monitor vehicle movement 58 and/or external shock 60 applied on the vehicle, such as rocking or lifting by hydraulics or other similar means. Once the desired alarm signal is activated from the alarm activation cluster 30, the radio frequency or infrared vehicle receiver 44 monitors the vehicle sensors for unauthorized movement or similar motion.

If enough force is applied to trigger one or more of the vehicle sensors 48, the radio frequency or infrared vehicle receiver 44 will transmit a signal by radio frequency or infrared transmitter 40, which is then received by an antenna 42 and then received by a radio frequency or infrared wrist watch receiver 46. The radio frequency or infrared wrist watch receiver 46 transmits the received signal to the wrist watch central control unit 38, which then triggers the appropriate alarm signal, and may include a visual alarm signal 32', an audible alarm signal 34', or a vibrational alarm signal 36'.

Figure 4:
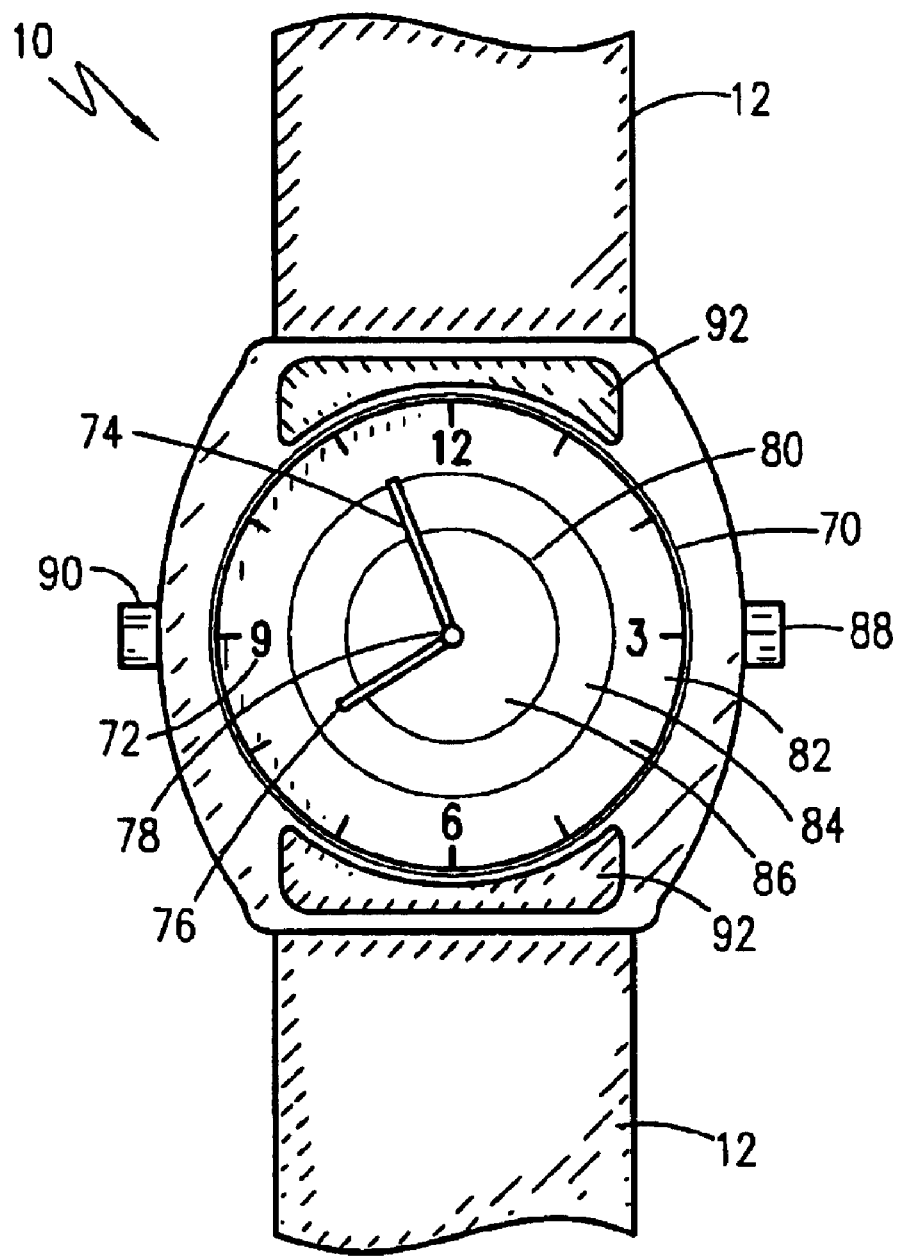
FIG. 4 illustrates an alternative embodiment of the security alarm wrist watch viewed from the front, in which the wrist watch is a gear-driven watch.

FIG. 4 illustrates an alternative embodiment of a security alarm wrist watch 10 in accordance with the invention shown. This embodiment is an example of the security alarm wrist watch 10 for a standard gear-driven wrist watch, as opposed to the digitally displayed wrist watch provided for in FIG. 1.

The wrist watch face 70 houses the hour and minute markings 72, the hour hand 74, the minute hand 76, in which the hour hand 74 and the minute hand 76 are coupled to a rotable center stem 78, and supported by a back panel support means 80. As further illustrated in FIG. 5, the back panel support means 80 through its center receives the rotable center stem 78. The wrist watch face 70 is capped by a transparent protective means 94, which is generally of a glass or durable plastic composition. Along the side of the security alarm wrist watch 10 is a rotable winding stem 88, which is a means for adjusting the time displayed by the wrist watch and a means for activating or deactivating the desired security alarm signal. Optionally, a separate stem or key 90 may be placed along the side of the security alarm wrist watch 10 to activate or deactivate the desired security alarm signal. Optionally, a speaker 92 may be placed on the wrist watch to transmit an audible alarm signal.

Figure 5:
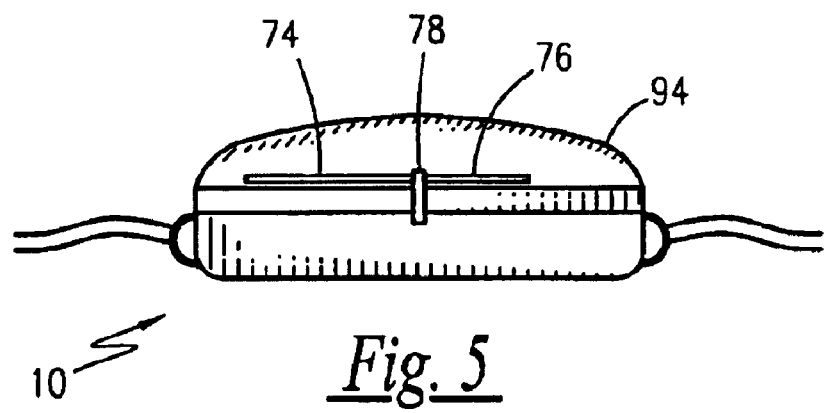
FIG. 5 illustrates a cross-sectional view of the alternative embodiment of the security alarm wrist watch.
Figure 6:
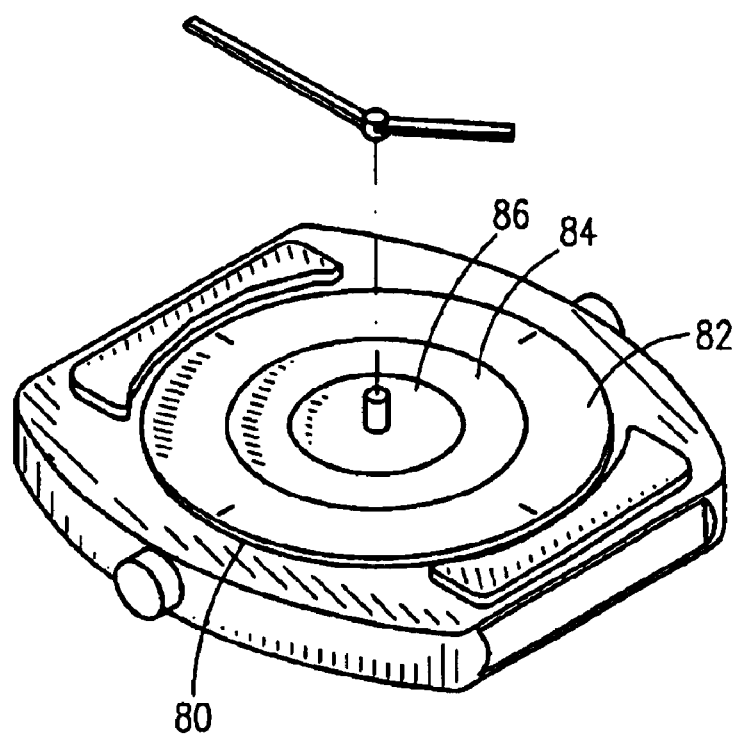
FIG. 6 is an exploded view of the alternative embodiment of the security alarm wrist watch, in which the hour and minute hands are removed to expose the back panel support means 80.

In FIG. 4 through FIG. 6, and specifically illustrated in FIG. 6, the back panel support means 80 is shown as having three regions; an outer luminescent region 82, an intermediate luminescent region 84, and an inner luminescent region 86. Each luminescent region would correspond to a respective security alarm signal. For example, the outer luminescent region 82 may be designated as the representative region for the visual alarm signal, the intermediate luminescent region 84 may be designated the audible alarm signal, and the inner luminescent region 86 may be designated the vibrational alarm signal. Likewise, other variations of this representation may be assigned to the respective regions. When one of the desired alarm signals is activated, either by depressing the rotable winding stem 88 or depressing the separate stem or key 90, a corresponding luminescent region will be lit. Activation of additional alarm signals will result in the lighting of the corresponding luminescent regions. Deactivation of any signal will result in the corresponding region returning to an unlit status.

For example, in one embodiment of the alternative described in FIG. 4 through FIG. 6, the rotable winding stem 88 is depressed once to activate the visual alarm signal, with said activation lighting the outer luminescent region 82. The rotable winding stem 88 is depressed a second time to activate the vibrational alarm signal, with said activation lighting the intermediate luminescent region 84. The rotable winding stem 88 is depressed a third time to activate the audible alarm signal, with said activation lighting the inner luminescent region 86. Depressing the rotable winding stem 88 a fourth time would result in the deactivation of all alarm signals. The advantage of sequencing the alarm signals in the order of visual signal, vibrational signal and audible signal allows a user to set the alarms in consideration of potential public annoyance. A user could depress the rotable winding stem 88 twice, activating the visual and vibrational alarm signals, without activating the audible alarm signal if the circumstances dictated such discretion, such as in a library or in a meeting.

2. Operation of the Preferred Embodiment

To use the present invention, in accordance with the preferred embodiment of the present invention, as shown in FIG. 1 and FIG. 3, a security system is installed in the vehicle upon purchase of the security alarm wrist watch 10 or a coded signal is used to make the security alarm wrist watch 10 compatible to an already installed security system. The user visually locates the alarm activation cluster 30 and chooses the desired security alarm signal. The user depresses the security alarm signal key to activate the desired security alarm signal. The user then visually locates the intermediate display cluster 20 and determines if the appropriate security alarm signal has been activated by viewing the visual alarm display 22. If the user activates only the visual alarm signal, a light within the visual alarm display 22 will indicate that the visual alarm signal is activated. If the user activates the audible alarm signal, an audible alarm indicator 24 will appear within the visual alarm display 22. If the user activates the vibrational alarm signal, a vibrational alarm indicator 26 will appear within the visual alarm display 22.

To deactivate any or all of the security alarm signals, the user selects the appropriate signal for deactivation. The user then visually locates the alarm activation cluster 30 and depresses the appropriate security alarm signal key. After the user depresses the appropriate security alarm signal key, the user visually locates the visual alarm display 22 to verify that the appropriate security alarm display has disappeared from the visual alarm display 22.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. An alarm wrist watch comprising:
    a fastening band for securing the alarm wrist watch to a person's wrist;
    a display face for displaying time, day, date and security alarm information, said display face housing an upper display cluster, an intermediate display cluster, and a lower display cluster;
    a plurality of watch control means by which a user can adjust the time, day and date information of said upper display cluster, said intermediate display cluster, and said lower display cluster; and
    audible alarm means in wireless communication with a motor vehicle security system; wherein said audible alarm means is audibly annunciated when initiated by said motor vehicle security system.

2. The alarm wrist watch of claim 1, wherein activation of a specific alarm signal is transmitted by radio frequency or infrared transmitter which is received by an antenna coupled to a radio frequency or infrared vehicle receiver.

3. The alarm wrist watch of claim 2, wherein said radio frequency or infrared vehicle receiver is coupled to a plurality of vehicle sensors for monitoring vehicle movement and external shock applied on said vehicle.

4. The alarm wrist watch of claim 1, wherein said upper display cluster comprises a digital watch in which the time, day and date are displayed in a variation of arrangements on the face.

5. The alarm wrist watch of claim 1, wherein said intermediate display cluster houses a visual alarm display and a speaker through which an audible alarm is communicated.

6. The alarm wrist watch of claim 1, wherein said lower display cluster houses a plurality of alarm control means for activating and deactivating said audible alarm means.

7. The alarm wrist watch of claim 1, wherein a wrist watch central control unit is housed within circuitry of said display face.

8. The alarm wrist watch of claim 1 further comprising visual alarm means in wireless communication with said motor vehicle security system.

9. The alarm wrist watch of claim 8 further comprising a plurality of vehicle sensors, wherein said plurality of vehicle sensors comprises:
    a plurality of door sensors;
    an engine hood sensor;
    a trunk hood sensor; and
    a plurality of window sensors;
said plurality of door sensors, said engine hood sensor, said trunk hood sensor and said plurality of window sensors in wireless communication with said audible alarm means and said visual alarm means.

10. The alarm wrist watch of claim 9, wherein said plurality of vehicle sensors further comprises a vehicle movement sensor in wireless communication with said audible alarm means and said visual alarm means, said vehicle movement sensor detecting extraneous movement of a vehicle not detected by a vibration sensor.

11. The alarm wrist watch of claim 1 further comprising vibrational alarm means in wireless communication with said motor vehicle security system.

12. The alarm wrist watch of claim 11 further comprising a plurality of vehicle sensors, wherein said plurality of vehicle sensors comprises:
    a plurality of door sensors;
    an engine hood sensor;
    a trunk hood sensor; and
    a plurality of window sensors;
said plurality of door sensors, said engine hood sensor, said trunk hood sensor and said plurality of window sensors in wireless communication with said audible alarm means and said vibrational alarm means.

13. The alarm wrist watch of claim 12, wherein said plurality of vehicle sensors further comprises a vehicle movement sensor in wireless communication with said audible alarm means and said vibrational alarm means, said vehicle movement sensor detecting extraneous movement of a vehicle not detected by a vibration sensor.

* * * * *